Nov. 12, 1935.  W. E. GOBLE  2,020,545
THRUST BEARING FOR DISK CULTIVATORS
Filed March 7, 1935
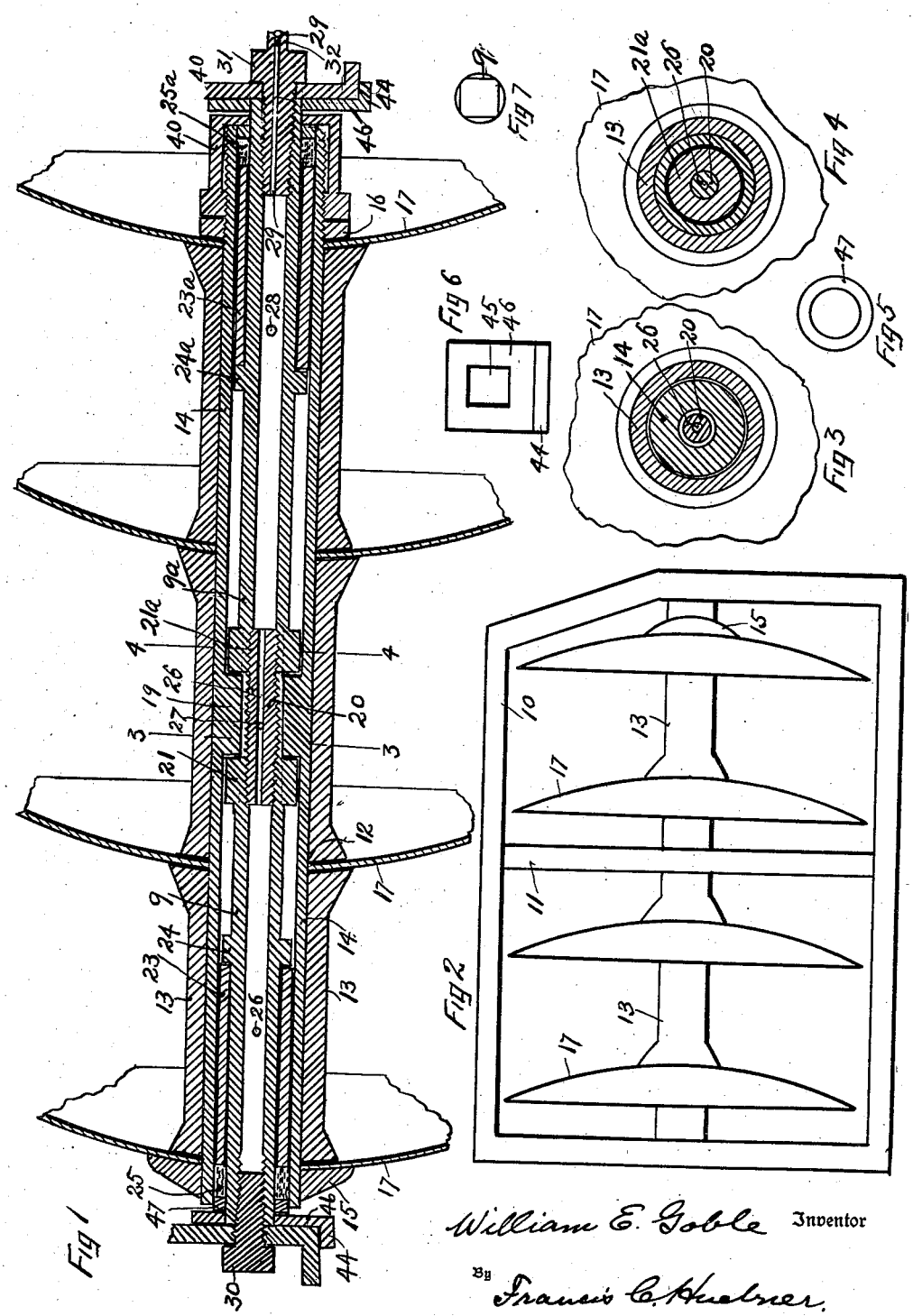

Patented Nov. 12, 1935

2,020,545

UNITED STATES PATENT OFFICE 2,020,545

THRUST BEARING FOR DISK CULTIVATORS

William E. Goble, Selma, Calif.

Application March 7, 1935, Serial No. 9,771

2 Claims. (Cl. 97—220)

My invention relates to a thrust bearing for a disk cultivator, and more specifically it is adapted for use in conjunction with the form of disk and the bearings therein disclosed in Patent No. 1,932,619, dated October 31, 1933, for Bearing for earth working tool heretofore issued to me. The object I have accomplished is the formation of a double thrust bearing which can be located at a selected position between the two ends of the axle, and which can easily be assembled. It is also noted that the bearings can be formed integral with the shafts or axles, or can be welded or brazed thereto, thus forming a strong union, and the bearing surface of the thrust bearing is larger than was possible in the device described in the patent above referred to. Other objects will be hereinafter disclosed.

These objects are accomplished by means of the device hereinafter described and illustrated on the accompanying drawing, in which Fig. 1 is a longitudinal sectional view of a section of a disk cultivator showing the thrust bearing in section.

Fig. 2 is a top view of a four disk section of a disk cultivator.

Fig. 3 is a cross sectional view of the device along the sectional line 3—3 in Fig. 1.

Fig. 4 is a cross sectional view of the device along sectional line 4—4 in Fig. 1.

Fig. 5 is a retaining ring.

Fig. 6 is a lock washer.

Fig. 7 shows the squared end of the axle.

Referring to the drawing, I have constructed a frame 10 having sides, ends and braces. In form it may be a parallelogram, a rhomboid, or such other shape as may conform to the use to which the cultivator is intended. The cross support on the frame is designated 11. Within this frame the disk assembly is carried. The disk assembly consists of a plurality of disks 17, which are uniformly spaced apart with spools 13. Each of the disks has a hole 12 through the disk concentric with the disk through which hole a tube 14 can pass. This tube has a stop 15 attached to one end, or adjacent to an end, and the spools have a longitudinal hole therethrough of sufficient diameter to slide on tube 14. One disc is placed on tube 14 adjacent to the stop 15, and spools and disks are then threaded alternately on the tube to the number desired, and the assembly of tube, disk blades and spools are clamped together by means of a nut 16 on the end of the tube opposite to stop 15. Within the tube, and between the ends thereof, but preferably near the longitudinal center of the tube, I have attached a thrust-block 19. As shown in Fig. 3 the thrust block is tubular in form.

The axle on which the disk and tube assembly rotates consists of two parts, designated as 9 and 9a. These two axle parts are joined together by a stud 20. The ends of the axle parts 9 and 9a connected by the stud have thrust bearings 21 and 21a attached thereto. These thrust bearings can be formed integral with the portions of the axle to which they are attached, or they can be welded. In my construction I find the cheaper plan is to weld the bearings to the shaft. It is noted that the stud 20 should be of such length that the thrust bearings 21 and 21a can closely approach the thrust block 19, and the stud should preferably be of less diameter than the axle. It is also noted that the axle is hollow and the stud has a lead 26 therethrough to carry lubricating oil to the parts to be oiled.

The bearings on which the disk assembly rotates consists of sleeve bearings 23 and 23a which fit between the axle and tube 14. These are held in position by means of stop blocks 24 and 24a attached to the axle, and packing 25 and 25a at the opposite end. At the one end the packing is held in by a retaining ring 47, also shown as Fig. 5, and at the other end by a cap 40 which also served as a lock nut for nut 16.

The assembly is held in frame 10 by means of cap screws 30 and 31. It will be noted that 30 cap screw 31 has a lead 29 therethrough and an oil cup 32 thereon to pass lubricating oil into the axle, and oil holes 26, 27 and 28 are formed through the axle to the bearings to be lubricated. The axle is attached rigidly to the frame by being squared at one end as shown in Fig. 7, and by the use of a lock washer 46 having a square hole 45 therein which fits over the squared end of the axle and having a flange 44 thereon which engages with the frame.

Having described my invention I claim as new and ask for Letters Patent:

1. In a thrust bearing for a disk cultivator having a tubular member adapted to carry the disk blades, a thrust block attached to the interior of the tubular member, an axle constructed of two parts, each of said axle parts having a thrust bearing attached thereto, a threaded member adapted to hold the adjacent ends of the two parts of the axle together, and adapted to hold the thrust bearings a spaced distance apart, said assembled tubular member and disk blades being adapted to rotate on said assembled axle, and the thrust block being positioned and adapted to engage said thrust bearings.

2. In a disk cultivator having the disk blades attached to a hollow tube and a fixed axle around which the assembly of tube and disk blades are adapted to rotate, a thrust bearing assembly comprising a thrust block attached to the inside of the tube, an axle constructed in two sections attached together by screw means, thrust bearings attached to each of said sections of the axle, said screw holding the sections of the axle together being adapted to hold the thrust bearings in a spaced relation with the thrust block.

WILLIAM E. GOBLE.